United States Patent Office 3,040,072
Patented June 19, 1962

3,040,072
Δ⁹⁽¹¹⁾-ALLOPREGNENE AND PROCESS FOR ITS MANUFACTURE
Albert Wettstein, Georg Anner, Charles Meystre, Peter Wieland, Ludwig Ehmann, Karl Heusler, Alfred Hunger, and Jindrich Kebrle, all of Basel, Switzerland, assignors to Ciba Corporation, a corporation of Delaware
No Drawing. Filed July 1, 1959, Ser. No. 824,211
Claims priority, application Switzerland July 4, 1958
3 Claims. (Cl. 260—397.45)

The present invention relates to a process for the manufacture of Δ⁹⁽¹¹⁾-16α-methyl-allopregnene-17α:21-diol-3:20-dione and its 21-esters from Δ⁹⁽¹¹⁾-16α-methyl-allopregnene-3β:17α-diol-20-one.

The introduction of a 21-acetoxy group in 3β:17α-dihydroxy-20-ketones by bromination and exchanging the bromine atom for the acetoxy group and subsequent oxidation in the 3-position has often been carried out. When a 9:11-double bond is present, these reactions can only be carried out with difficulty since, particularly in the alloseries, this double bond also reacts with bromine. In the case of 16-unsubstituted compounds it is possible to direct the bromination in such a way that after treatment with potassium acetate the 21-acetate can be isolated in moderate yield.

On the other hand, when the above process was applied to Δ⁹⁽¹¹⁾-16α-methyl-allopregnene-3β:17α-diol-20-one, only traces of the 21-acetoxy compound were formed when bromination was carried out with 1 mol of bromine followed by treatment with potassium acetate in acetone.

It has been found that the yield in this process in the 16α-methyl series can be considerably increased when Δ⁹⁽¹¹⁾ - 16α - methyl - allopregnene-3β:17α-diol-20-one is treated with 2 to 2.5 mols of bromine, the resulting polybromide heated in a dialkyl formamide in the presence of lithium acetate, the free hydroxyl group oxidized and, if desired, the 21-acetoxy group hydrolysed.

The bromination in the 21-position is advantageously carried out with bromine in a solvent such as, for example, as chloroform or dioxane, and it is of advantage to initiate the reaction by adding an acid, for example hydrochloric or hydrobromic acid. The bromine may be added undiluted, or dissolved in chloroform or glacial acetic acid, or, for example, in the form of dioxane-perbromide. For the 21-bromination it is of advantage to use somewhat more than 2 mols of bromine per mol of substance, since the 9:11-double bond also reacts with bromine. Surprisingly, in the subsequent treatment with a metal acylate, particularly with lithium acetate in dimethyl formamide, not only is the 21-bromide replaced by an acyloxy group, but the 9:11-double bond is reformed.

For the oxidation of the hydroxyl group in the 3-position to the keto group those oxidizing agents are used which do not affect the esterified dihydroxyacetone side chain, e.g. chromic acid-pyridine complex or, when the reaction time is short, a mixture of chromic acid, sulfuric acid and acetone. The oxidation can be achieved very advantageously also with an N-chloro- or N-bromocarboxylic acid amide or -imide, for example with bromosuccinimide or bromacetamide in aqueous or non-aqueous solvent, e.g. acetone, dioxane or methylene dichloride or ethylene dichloride with or without the addition of a tertiary amine, for example pyridine.

The 21-acetoxy group can then, if desired, be hydrolysed, for example with potassium carbonate in methanol or with potassium hydroxide in alcohol etc.

Δ⁹⁽¹¹⁾-16α-methyl-allopregnene-17α:21-diol-3:20-dione and its 21-esters, e.g. the acetate, propionate etc., can also be obtained from the corresponding 11β-hydroxy- and 11α-hydroxy-16α-methyl-allo-pregnane-17α:21 - diol-3:20-diones or their 21-esters by elimination of water. The preparation of these compounds and the splitting off of the 11α-hydroxyl group via the tosylate or mesylate is described in our copending application Serial No. 824,210, filed July 1, 1959.

The products of the process are important intermediate products for the manufacture of 16α-methyl-corticosteroids which are distinguished by a particularly strong antiinflammatory action without at the same time having the side-effect of sodium retention or only to a very slight degree. Among these highly active corticosteroids there may be mentioned more especially 16α-methyl-prednisone, 16α-methyl-prednisolone, 16α-methyl-9α-fluoro-prednisone and 16α-methyl-9α-fluoro-prednisolone.

The conversion of the products of the process into these highly active compounds is carried out as described, for example, in patent application No. 824,209, filed January 1, 1959. That process consists in introducing a 1:2- and a 4:5-double bond by treatment with selenium compound having a dehydrogenating action, for example with selenium dioxide in amylene hydrate.

A possibly required conversion of the 9:11-double bond into a 9:11-epoxide, a 9α-chloro- or 9α-fluoro-11-hydroxy or -11-keto grouping is performed by the known method. The 9:11-double bond is additively combined with hypobromous acid in the presence of a strong acid, for example perchloric acid; hydrobromic acid is eliminated with the acid of a basic agent such as potassium acetate or lithium acetate; and the resulting 9:11β-epoxide is treated with hydrochloric or hydrofluoric acid. Oxidation, for example with chromic acid-pyridine complex, yields the corresponding 11-ketone.

The following Examples illustrate the invention:

*Example 1*

300 mg. of Δ⁹⁽¹¹⁾-16α-methyl-allopregnene-3β:17α-diol-20-one are stirred for 5 minutes with 6 cc. of a 0.2N-hydrochloric acid solution in chloroform containing alcohol of 1% strength. A solution of 280 mg. of bromine in 4 cc. of chloroform is slowly added dropwise and the whole is then stirred for 10 minutes. The pale solution is then diluted with ethyl acetate, the ethyl acetate solution washed with water, dried and evaporated in vacuo. 6 cc. of dimethyl formamide and 600 mg. of lithium acetate are added to the crystalline residue and the resulting solution is heated for 1 hour at 60° C. The solution is diluted with ethyl acetate, the ethyl acetate solution washed with dilute hydrochloric acid and water, dried and evaporated in vacuo. The residue is then recrystallized from methanol or from acetone. There is obtained pure Δ⁹⁽¹¹⁾-16α-methyl-21-acetoxy-allopregnene-3β:17α-diol-20-one in the form of lamellae which are transformed into prisms at 175° C. which then melt at 200° C.

A sample of this compound is heated for one hour in a mixture of pyridine and acetic anhydride at 70° C., diluted with a little water and evaporated in vacuo. The residue is taken up in ether, the ethereal solution washed with dilute hydrochloric acid and water, dried and evaporated in vacuo. The Δ⁹⁽¹¹⁾-16α-methyl-3β:21-diacetoxy-allopregnene-17α-ol-20-one obtained as residue and recrystallized from a mixture of ether and pentane melts at 163–165° C. In the infrared spectrum (in $CH_2Cl_2$) the product exhibits bands inter alia at 2.77μ, 5.71μ and 5.78μ.

160 mg. of Δ⁹⁽¹¹⁾-16α-methyl-21-acetoxy-allopregnene-3β:17α-diol-20-one are dissolved in 8 cc. of ethylene chloride. 0.4 cc. of pyridine and 0.2 gram of N-bromosuccinimide are added to the solution which is allowed to stand for 16 hours at 20° C. The excess N-bromosuccinimide is then destroyed with a little sodium bisulfite solution, the ethylene chloride solution is washed with water, dried and evaporated in vacuo. The residue is filtered in benzolic solution on a little aluminum oxide and the filtrate evaporated. The $\Delta^{9(11)}$-16α-methyl-21-acetoxy-allopregnene-17α-ol-3:20-dione obtained as residue is crystallized from acetone in the form of needles melting at 219–224° C. Optical rotation $[\alpha]_D^{27} = +41.3°$ (in chloroform). In the infrared spectrum (in methylene chloride) the product exhibits bands inter alia at 2.76μ, 5.70μ, 5.72μ (shoulder) and 5.82μ. By hydrolysis with potassium carbonate in methanol there is obtained $\Delta^{9(11)}$-16α-methyl-allopregnene-17α:21-diol-3:20 dione.

The preparation of 16α-methyl-diol used as starting material in the above example is described in Example 2.

*Example 2*

To a solution of methyl magnesium iodide in 80 cc. of ether prepared from 1 gram of magnesium are added 190 cc. of absolute tetrahydrofurane, and then 150 cc. of the solvent are distilled off in the course of ½ hour. To the residual solution, cooled to 10° C., are added first 250 mg. of cuprous chloride and then at a bath temperature of 20° C. in the course of 45 seconds a solution of 7 grams of $\Delta^{16}$-3β-acetoxy-allopregnene-11:20-dione in 50 cc. of absolute tetrahydrofurane, the vessel containing the latter solution being rinsed out with 10 cc. of tetrahydrofurane. The temperature rises to 31° C. and the reaction mixture becomes yellow. After stirring the mixture for 30 minutes, there is added while cooling at a bath temperature of 20° C. in the course of 1¾ minutes a mixture of 3 cc. of acetyl chloride and 25 cc. of tetrahydrofurane, the temperature rising to 28° C. and the color changing from yellow to grey. The whole is then stirred at room temperature for 40 minutes, and cooled to 10° C. and there are run in in succession 30 cc. of saturated ammonium chloride solution, 50 cc. of ether and 30 cc. of water. The two clear layers in the flask are washed with 100 cc. of ether in a separating funnel, and then thoroughly shaken, and the aqueous phase is separated and again extracted with 75 cc. of ether. The organic phases are extracted by agitation in succession twice with 50 cc. of a 1-molar solution of sodium thiosulfate, a mixture of 50 cc. of saturated sodium chloride solution and 15 cc. of a saturated solution of sodium hydrogen carbonate, and twice with 50 cc. of saturated sodium chloride solution, and then dried with magnesium sulfate, and evaporated first at atmospheric pressure and then under the reduced pressure of a water jet pump. The residue is dissolved in xylene, evaporated in vacuo, then these operations are repeated once more. A solution of the resulting oil in 50 cc. of hexane is filtered through 8 grams of aluminum oxide (activity III). The aluminum oxide is washed with 250 cc. of hexane, the eluate is evaporated under the reduced pressure of a water jet pump, the residue is dried for 1½ hours at 80° C. under 0.05 mm. pressure in a rotary evaporator. A considerable quantity of a fragrant oil distils. The practically colorless coating which remains behind is dissolved in 14 cc. of pentane, the solution is allowed to stand for 20 hours at 0° C., and then the crystals which separate are filtered off and washed with cold pentane. There are obtained 6.2 grams of $\Delta^{17(20)}$-16α-methyl-3β:20-diacetoxy-allopregnene-11-one in the form of a stereo-isomeric mixture melting at 154–163° C. Recrystallization from 34 cc. of methanol raises the melting point to 164–165.5° C. The infra-red spectrum of the crystallized enol-acetate taken up in methylene chloride shows bands at 5.73μ plus 5.77μ (acetates); 5.85μ (11-ketone) and 8.13μ plus 8.24μ (acetates).

To a solution of 4 grams of crystalline $\Delta^{17(20)}$-16α-methyl-3β:20-diacetoxy-allopregnene-11-one in 150 cc. of absolute tetrahydrofuran is added with stirring a solution of 500 mg. of sodium-boron hydride in 2 cc. of water, the container of this solution being rinsed out with 50 cc. of tetrahydrofuran which is added to the mixture and the whole is left for 9 days at room temperature. On the third day a further 500 mg. and on the fifth and eighth days further quantities of 200 mg. of sodium-boron hydride are added. Afterwards the whole is poured into 1 liter of 6% common salt solution, extracted three times with ether and the ethereal solutions washed twice with 6% common salt solution. The residue from the dried and evaporated ethereal solutions is dissolved in 25 cc. of ether and treated with 22 cc. of molar monoperphthalic acid solution in ether. Four days later 200 cc. of ether are added followed by extraction with 100 cc. of saturated sodium bicarbonate solution, extraction three times with 80 cc. of N-sodium hydroxide solution and 3 times with 80 cc. of water. The aqueous solutions are extracted by shaking twice with 200 cc. of ether, whereupon the ethereal solutions are combined, dried and evaporated. To a boiling solution of the residue in 160 cc. of methanol is added a solution of 2 grams of potassium carbonate in 40 cc. of water, freed from oxygen by blowing in nitrogen. After 2½ hours boiling under reflux in the stream of nitrogen, the whole is cooled, poured into 650 cc. of 6% common salt solution and the mixture extracted three times with 250 cc. of chloroform. The organic solutions are washed twice more with 200 cc. of saturated common salt solution, dried and evaporated under vacuum. By recrystallizing the crystalline residue from a methylene chloride-methanol-ether mixture in the presence of 100 mg. of "Carboraffin," 2.26 grams are obtained of 16α-methyl-allopregnane-3β:11β:17α-triol-20-one.

2 grams of 16α-methyl-allopregnane-3β:11β:17α-20-one are heated at 70° C. in 4 cc. of pyridine and 8 cc. of acetic anhydride for 2 hours with stirring. The resulting solution is evaporated in vacuo after the addition of water. The residue is taken up in ethyl acetate, the ethyl acetate solution is washed with dilute hydrochloric acid, water, dilute sodium carbonate solution and water, dried and evaporated in vacuo. From the residue there is obtained by recrystallization from acetone-pentane or ether-pentane 16α-methyl-3β-acetoxy-allopregnane-11β:17α-diol-20-one in the form of crystals melting at 205—211° C.

400 mg. of 16α-methyl-3β-acetoxy-allopregnane-11β:17α-diol-20-one are dissolved in 10 cc. of tetrahydrofuran. 0.5 cc. of glacial acetic acid and 0.1 cc. of perchloric acid are added to the solution, the whole is boiled for 1 hour under reflux, cooled, ether is added, the ethereal solution washed with water, dried and evaporated in vacuo. The residue is then chromatographed on 16 grams of aluminum oxide. From the evaporated benzene-pentane 1:1 fractions and from the benzene fractions there is obtained after recrystallization from ether-pentane pure $\Delta^{9(11)}$-16α-methyl-3β-acetoxy-allopregnene-17α-ol-20-one melting at 180–182° C.

300 mg. of $\Delta^{9(11)}$-16α-methyl-3β-acetoxy-allopregnene-17α-ol-20-one are dissolved in 20 cc. of methanol. 300 mg. of potassium carbonate and 1 cc. of water are added to the solution and the whole is boiled under reflux for one hour. The residue of the solution evaporated in vacuo is extracted with 150 cc. of ethyl acetate, the ethyl acetate solution is washed with water, dried and evaporated in vacuo. The difficultly soluble residue is recrystallized from methanol and yields $\Delta^{9(11)}$-16α-methyl-allopregnene-3β:17α-diol-20-one in the form of lamellae melting at 238–248° C.

*Example 3*

The same $\Delta^{9(11)}$-16α-methyl-21-acetoxy-allopregnene-17α-ol-3:20-dione can be obtained from the corresponding 11β-hydroxy-compound as follows:

1 gram of 16α-methyl-21-acetoxy-allopregnane-11β:17α-diol-3:20-dione is dissolved in 10 cc. of pyridine; 0.75 gram of N-bromosuccinimide is added and the solution is stirred for ¼ hour at room temperature under nitrogen, then cooled to −10° C., and at this temperature dry sulfur dioxide gas is introduced until a sample of the reaction solution no longer colors acidified potassium iodide-starch paper. The reaction solution is treated with 40 cc. of water, stirred with ice-cooling for 1 hour, and the precipitated reaction product is suctioned off. Crystallization from methanol yields $\Delta^{9(11)}$-16α-methyl-21-acetoxy-allopregnene-17α-ol-3:20-dione which gives a yellow reaction with tetranitromethane and melts at 219–224° C.

The resulting product is in every respect identical with that described in Example 1.

What is claimed is:

1. Process for the manufacture of a new $\Delta^{9(11)}$-allopregnene, wherein $\Delta^{9(11)}$-16α-methyl-allopregnene-3β:17α-diol-20-one is treated with 2 to 2.5 mols of bromine, the resulting polybromide is heated in a dialkyl formamide in the presence of lithium acetate and the free 3-hydroxyl group is oxidized to form the corresponding 3-oxo-21-acyloxy-allopregnene.

2. Process for the manufacture of a new $\Delta^{9(11)}$-allopregnene, wherein $\Delta^{9(11)}$-16α-methyl-allopregnene-3β:17α-diol-20-one is treated with 2 to 2.5 mols of bromine, the resulting polybromide is heated in a dialkyl formamide in the presence of lithium acetate, the free 3-hydroxyl group is oxidized, and the 21-acetoxy group hydrolysed to form the corresponding 3-oxo-21-oxy-allopregnene.

3. Process as claimed in claim 1, wherein the polybromide is treated with lithium acetate in dimethyl formamide to form the corresponding $\Delta^{9(11)}$-3β-hydroxy-21-acyloxy-allopregnene.

References Cited in the file of this patent
UNITED STATES PATENTS 2,640,839    Wendler et al.    June 2, 1953
2,945,029    Nomine et al.    July 12, 1960

OTHER REFERENCES

Kritchevsky et al.: J.A.C.S., vol. 74, pp. 483–6 (1952).

Arth et al. J.A.C.S., vol. 80, pp. 3160–1 (June 20, 1958).

Arth et al.: J.A.C.S., vol. 80, pp. 3161–3 (June 20, 1958).

Oliveto et al.: J.A.C.S., vol. 80, p. 4431 (August 20, 1958).